United States Patent [19]
Mouton

[11] Patent Number: 5,735,116
[45] Date of Patent: Apr. 7, 1998

[54] SYSTEM FOR RESTARTING AN AIRCRAFT ENGINE IN FLIGHT AFTER LOSS OF ENGINE POWER

[75] Inventor: Pierre Mouton, Grigny, France

[73] Assignee: Societe Nationale D'Etude et de Construction de Moteurs D'Aviation "Snecma", Paris, France

[21] Appl. No.: 771,288

[22] Filed: Dec. 20, 1996

[30] Foreign Application Priority Data

Dec. 20, 1995 [FR] France ..................... 95 15119

[51] Int. Cl.⁶ .......................................... F02C 7/268
[52] U.S. Cl. ............................... 60/39.091; 60/39.142
[58] Field of Search ........................ 60/39.091, 39.13, 60/39.142, 39.183, 223; 244/53 A

[56] References Cited

U.S. PATENT DOCUMENTS

| | | | |
|---|---|---|---|
| 2,711,071 | 6/1955 | Frankel | 60/39.142 |
| 3,315,085 | 4/1967 | Mileti et al. | 60/39.183 |
| 3,472,024 | 10/1969 | Strub et al. | 60/39.142 |
| 4,062,185 | 12/1977 | Snow | 60/39.183 |

FOREIGN PATENT DOCUMENTS

| | | |
|---|---|---|
| 2 068 073 | 8/1971 | France. |
| 317 251 | 12/1956 | Switzerland. |

Primary Examiner—Louis J. Casaregola
Attorney, Agent, or Firm—Oblon, Spivak, McClelland, Maier & Neustadt, P.C.

[57] ABSTRACT

In an aircraft in which servocontrols are supplied with hydraulic fluid under pressure by a main pump driven by an engine of the aircraft and, in the event of loss of said engine power, by an emergency pump which is driven by a dynamic air pressure turbine deployed from the fuselage of the aircraft, a system is provided for assisting the restarting of said engine in the event of said aircraft suffering a total loss of engine power, wherein said main pump is of the reversible kind and means are provided for enabling surplus hydraulic power from the emergency pump to be supplied to the main pump whereby the latter acts as a hydraulic motor to increase the windmilling speed of the dead engine and thereby facilitate re-ignition thereof, even at a low aircraft speed.

3 Claims, 2 Drawing Sheets

SYSTEM FOR RESTARTING AN AIRCRAFT ENGINE IN FLIGHT AFTER LOSS OF ENGINE POWER

BACKGROUND OF THE INVENTION

The invention relates to a system for assisting the restarting of at least one dead engine of an aircraft in flight, especially in the case where the aircraft has suffered a complete loss of engine power.

Stoppage of one engine of a multi-engine aircraft in flight is a restrictive situation, but it is not critical for flight safety if the dead engine cannot be restarted. The only real risk, particularly in a twin-engine aircraft, is that the aircraft may have to be diverted. In these circumstances, the ability to effect in-flight restarting affects economic factors such as diversion of the aircraft or loss of height. Restart conditions after the stoppage of only one engine are optimal if there are available a restart device, the full capacity of the ignition and fuel supply systems and of all the essential functions of the aircraft, including all the necessary cockpit indicators, and an aircrew in full possession of its facilities.

The situation is different if the aircraft suffers a total loss of engine power. In this case the ability or inability to restart the engines, or at least one engine, means the difference between avoiding or having an accident. Failure to restore engine power can lead to a catastrophic situation since the complete loss of engine power deprives the aircraft of its thrust and of its electrical, hydraulic and compressed air generators. The auxiliary power unit may also have failed, since the aircraft can take off when the auxiliary unit is not in operation. In such a situation the only possibility of re-ignition is to use the windmilling of the engine.

However, compared with low bypass ratio turbojet engines, modern high bypass ratio engines have a smaller field of flight in which re-ignition of a windmilling engine is possible. It is therefore often necessary to increase aircraft speed in order to boost the windmilling speed sufficiently to restart a modern engine.

This step is unrealistic during ground approach with dead engines. An accident may therefore occur if the pilot cannot, or waits too long to, initiate the restart procedure while the rotor is slowing down to its windmilling speed, which is too low for re-ignition, or when the pilot has to wait for environmental reasons.

SUMMARY OF THE INVENTION

The aim of the invention is to provide a system which can be used to achieve stabilised windmilling of a dead engine at a level sufficient to restart it even if the aircraft is travelling at a reduced air speed corresponding to a minimum rate of descent.

It is known to use a dynamic air pressure turbine, which is normally disposed in the aircraft fuselage, to supply hydraulic power to the aircraft flight control systems in the event of a loss of engine power, the hydraulic power normally being supplied by a main pump driven by the aircraft engine, and the invention achieves its aim by proposing to use the surplus hydraulic energy supplied by the air turbine in stabilised flight conditions to increase the windmilling speed of the dead engine which it is required to restart.

Accordingly, the invention provides a system for assisting the restarting of at least one dead engine of an aircraft in flight using windmilling of said engine, especially in the event of said aircraft suffering a total loss of engine power, said aircraft including:

servocontrols;

a hydraulic circuit for supplying fluid under pressure to said servocontrols, said hydraulic circuit comprising a main pump for pressurizing said fluid, said main pump being driven by said engine, an emergency pump for pressurizing said fluid in the event of loss of engine power, a fluid reservoir, feed ducts connecting said reservoir to said pumps, delivery ducts connecting said pumps to said servocontrols, and a return duct connecting said servocontrols to said reservoir; and a dynamic air pressure turbine which is deployed from the fuselage of said aircraft for driving said emergency pump in the event of loss of engine power;

wherein said system comprises a reversible pump as said main pump, and means for enabling said emergency pump to supply hydraulic power to said reversible main pump whereby said reversible main pump operates as a hydraulic motor to increase the windmilling speed of said engine.

Preferably, said enabling means comprises:

a first bypass disposed between the delivery duct from said emergency pump and the feed duct to said main pump;

a second bypass disposed between the delivery duct from said main pump and said return duct to said reservoir;

a first selector for selectively causing said main pump to be supplied with fluid from said reservoir or from said first bypass; and, a second selector for selectively connecting said delivery duct from said main pump to said servocontrols or to said second bypass.

Flow regulators are preferably also provided in the first bypass and the second bypass.

Other advantages and preferred features of the invention will become apparent from the following description of a preferred embodiment, which is given by way of example, with reference to the accompanying drawings.

DESCRIPTION OF THE PREFERRED EMBODIMENT

Figure 1:
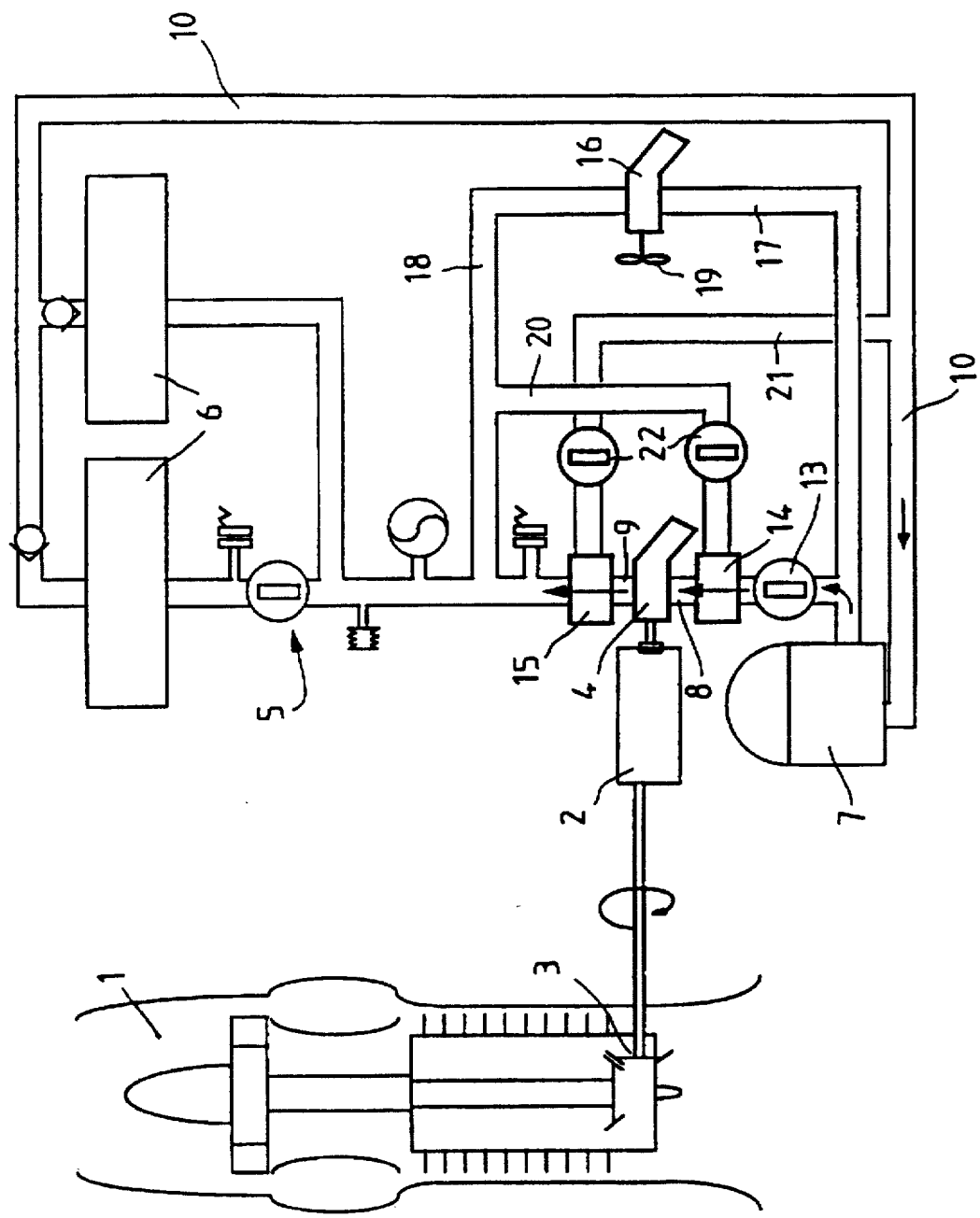
FIG. 1 shows diagrammatically a hydraulic circuit for the servocontrols of an aircraft and including a system in accordance with the invention, the circuit being shown operating normally with the main pump being driven by an engine of the aircraft; and, FIG. 2 is a view similar to FIG. 1 but showing the hydraulic circuit operating when there is a total loss of engine power and with the system of the invention in operation to increase the windmilling speed of the engine.

FIG. 1 shows an aircraft turbojet engine 1 which, in normal operation, drives a drive chain 2 via a power take-off 3. The drive chain 2 drives a main hydraulic pump 4 of a hydraulic circuit 5 which supplies pressurized fluid to the aircraft servocontrols 6, the pump 4 drawing the fluid from a reservoir 7 through a feed line 8 and discharging the pressurized fluid through a delivery line 9 to the servocontrols 6. The pressurized fluid leaving the servocontrols 6 returns to the reservoir 7 via a return line 10. Check valves 11, 12 are disposed in the hydraulic circuit 5 immediately downstream of the servocontrols 6.

Between the reservoir 7 and the main pump 4 the fluid goes through a flame cut-out valve 13 and a first selector 14 which, in the normal operating position shown in FIG. 1, connects the main pump feed line 8 to the reservoir.

A second selector 15 is disposed in the delivery line 9 from the main pump 4 and, in the position corresponding to normal operation of the engine 1, connects the delivery line 9 to the servocontrols 6.

An emergency pump 16, which is arranged to draw fluid from the reservoir 7 via a feed line 17 and deliver the pressurized fluid to the servocontrols 6 through a delivery line 18, is arranged to be driven by a dynamic air pressure turbine 19 which is housed in the aircraft fuselage and which is deployed automatically in the event of a total loss of aircraft engine power. In this critical situation the hydraulic circuit 5 delivers pressurized fluid from the emergency pump 16 to ensure normal operation of the servocontrols 6 by means of the energy provided by the air turbine 19.

As can be seen in FIG. 1, a first bypass 20 connects the delivery line 18 from the emergency pump 16 to the first selector 14, the latter being capable of adopting a second position in which the main pump feed line 8 is connected to the first bypass 20. A second bypass 21 connects the second selector 15 to the reservoir return line 10 and the second selector 15 is capable of adopting a second position in which the main pump delivery line 9 is connected to the second bypass 21. A regulator 22 closes the first bypass 20 and the second bypass 21 when the engine 1 is operating.

When the engine 1 is operating, the hydraulic circuit 5 is pressurized by the main pump 4. The bypasses 20, 21 are closed by the regulator 22, and the selectors 14, 15 are positioned to permit the main pump to draw fluid from the reservoir 7 via the feed line 8 and to deliver it through the line 9 to the servocontrols 6. The air turbine 19 is therefore inoperative and disposed in the aircraft fuselage.

Figure 2:
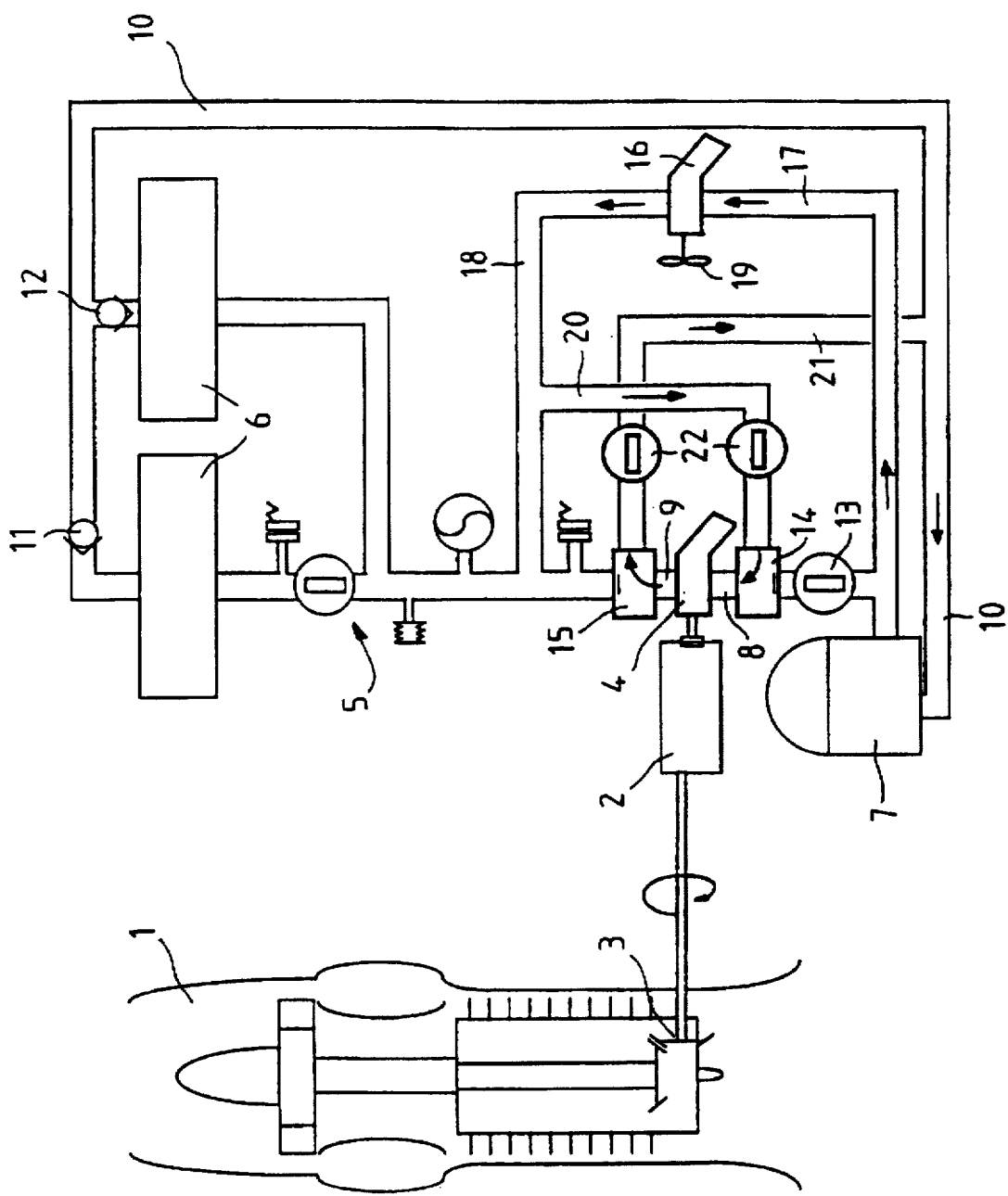

If all the engines become dead, the air turbine 19 is deployed automatically and drives the emergency pump 16. The selector 14 shuts off the reservoir 7 from the main pump feed line 8 and connects the latter to the first bypass 20, and the selector 15 closes the delivery line 9 and connects the outlet of the main pump 4 to the second bypass 21. The hydraulic power produced by the emergency pump 16 is supplied to the aircraft flight control systems, but after the flight of the aircraft has been stabilised there is an excess of hydraulic energy delivered by the emergency pump 16. At this stage the regulator 22 can be operated to supply the main pump 4 with pressurized fluid from the emergency pump 16 via the bypass 20, the fluid being returned to the reservoir 7 by way of the second selector 15 and the second bypass 21 in the manner shown in FIG. 2.

Since the main pump 4 is reversible, it then operates as a hydraulic motor and transmits power through the drive chain 2 to the power take-off 3 of the engine 1, thus enabling the windmilling speed of the engine to be increased considerably in order that the engine 1 can attain a speed in the range in which re-ignition is possible.

On an Airbus A320 equipped with CFM 56-5 engines a hydraulic power of 6 kW can provide a 6% increase in the speed of rotation of the high-pressure body of the engine 1, which is equivalent to an increase in windmilling speed of approximately 60 knots.

I claim:

1. A system for assisting the restarting of at least one dead engine of an aircraft in flight using windmilling of said engine, especially in the event of said aircraft suffering a total loss of engine power, said aircraft including:

servocontrols;

a hydraulic circuit for supplying fluid under pressure to said servocontrols, said hydraulic circuit comprising
    a main pump for pressurizing said fluid, said main pump being driven by said engine,
    an emergency pump for pressurizing said fluid in the event of loss of engine power,
    a fluid reservoir,
    feed ducts connecting said reservoir to said pumps,
    delivery ducts connecting said pumps to said servocontrols, and
    a return duct connecting said servocontrols to said reservoir; and
a dynamic air pressure turbine which is deployed from the fuselage of said aircraft for driving said emergency pump in the event of loss of engine power;

wherein said system comprises a reversible pump as said main pump, and means for enabling said emergency pump to supply hydraulic power to said reversible main pump whereby said reversible main pump operates as a hydraulic motor to increase the windmilling speed of said engine.

2. A system according to claim 1, wherein said enabling means comprises:

a first bypass disposed between the delivery duct from said emergency pump and the feed duct to said main pump;

a second bypass disposed between the delivery duct from said main pump and said return duct to said reservoir;

a first selector for selectively causing said main pump to be supplied with fluid from said reservoir or from said first bypass; and, a second selector for selectively connecting said delivery duct from said main pump to said servocontrols or to said second bypass.

3. A system according to claim 2, wherein flow regulators are provided in said first bypass and said second bypass.

* * * * *